(12) United States Patent
Kallianteris

(10) Patent No.: US 10,955,044 B2
(45) Date of Patent: Mar. 23, 2021

(54) ARRANGEMENT WITH A PRESS, WITH TWO STRUCTURAL COMPONENTS AND WITH AT LEAST ONE CLAMPING ELEMENT

(71) Applicant: Rolls-Royce Deutschland Ltd & Co KG, Blankenfelde-Mahlow (DE)

(72) Inventor: Christos Kallianteris, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 199 days.

(21) Appl. No.: 16/209,405

(22) Filed: Dec. 4, 2018

(65) Prior Publication Data
US 2019/0178367 A1   Jun. 13, 2019

(30) Foreign Application Priority Data

Dec. 8, 2017   (DE) ..................... 10 2017 129 359.0

(51) Int. Cl.
*F16H 57/08*   (2006.01)
*B23P 19/027*   (2006.01)
(Continued)

(52) U.S. Cl.
CPC .......... *F16H 57/082* (2013.01); *B23P 11/022* (2013.01); *B23P 19/027* (2013.01);
(Continued)

(58) Field of Classification Search
CPC  B30B 1/32; B30B 1/34; B30B 9/3057; B30B 15/0052; B30B 15/16; F16H 57/082; B23P 19/027
See application file for complete search history.

(56) References Cited

U.S. PATENT DOCUMENTS

| 2010/0230228 A1* | 9/2010 | Wernecke | ............. B23P 11/022 |
| | | | 192/66.2 |
| 2016/0067837 A1* | 3/2016 | Flender | ................. B23P 19/107 |
| | | | 29/888.1 |

FOREIGN PATENT DOCUMENTS

| DE | 3145521 A1 | 5/1983 |
| DE | 19544165 A1 | 5/1997 |

(Continued)

OTHER PUBLICATIONS

German Search Report dated Oct. 12, 2018 for counterpart German Patent Application No. DE 10 2017 129 359.0.

(Continued)

*Primary Examiner* — Adam J Eiseman
*Assistant Examiner* — Bobby Yeonjin Kim
(74) *Attorney, Agent, or Firm* — Shuttleworth & Ingersoll, PLC; Timothy Klima

(57) ABSTRACT

A press includes two components and a clamping element insertable in an axial direction, via an actuating element which is axially displaceable via an actuator, radially between a region of the first component and a region of the second component. The actuating element passes through the components and the clamping element in the axial direction. The actuating element at one end cooperates with the actuator and at the other end includes a cover element via which the actuating element is actively connected to the components. The clamping element is arranged between the cover element and the components, or between the components and a housing region of the actuator. The actuating element and/or the actuator is movable by the actuator, for insertion of the clamping element between the components, in a scope reducing an axial distance between the cover element and the housing region of the actuator.

11 Claims, 3 Drawing Sheets

Figure 1:
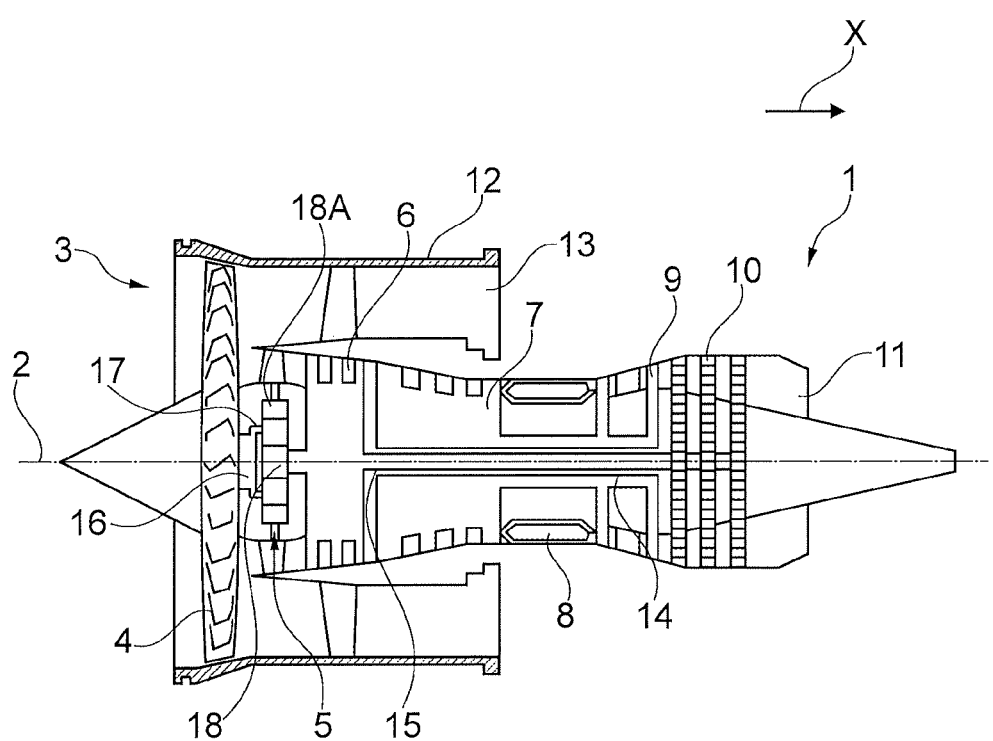

(51) Int. Cl.
*F16D 1/094* (2006.01)
*B23P 11/02* (2006.01)
*F01D 25/28* (2006.01)
*F16B 5/02* (2006.01)
*F02C 7/36* (2006.01)

(52) U.S. Cl.
CPC .............. *F01D 25/285* (2013.01); *F16B 5/02* (2013.01); *F16D 1/094* (2013.01); *F02C 7/36* (2013.01); *F05D 2230/60* (2013.01); *F05D 2260/40311* (2013.01)

(56) References Cited

FOREIGN PATENT DOCUMENTS

| | | |
|---|---|---|
| DE | 20307136 U1 | 9/2003 |
| DE | 102010040237 A1 | 3/2012 |
| EP | 0718515 A1 | 6/1996 |
| EP | 2050975 A1 | 4/2009 |

OTHER PUBLICATIONS

European Search Report dated Jun. 4, 2019 from counterpart European Patent Application No. 18210239.2.

\* cited by examiner

ARRANGEMENT WITH A PRESS, WITH TWO STRUCTURAL COMPONENTS AND WITH AT LEAST ONE CLAMPING ELEMENT

This application claims priority to German Patent Application DE102017129359.0 filed Dec. 8, 2017, the entirety of which is incorporated by reference herein.

The invention concerns an arrangement with a press, with two components and with at least one clamping element according to the type defined in more detail in the present disclosure.

Arrangements known in practice with a press, with two components and with at least one clamping element, are used to connect the two components together in a rotationally fixed fashion by means of the clamping element. The clamping element is inserted in the axial direction, radially between a region of the first compartment and a region of the second compartment, via an actuating element of the press. For this, the actuating element is axially displaceable by an often hydraulically actuatable actuator. Here, the first component is configured for example as a bearing bolt of a planet wheel of a planetary gear mechanism, while the second component is a planet carrier. To connect the bearing bolt to the planet carrier in a rotationally fixed fashion, clamping elements configured as clamping sleeves are inserted or pressed via the actuator of the press between end regions of the bearing bolt and end regions of the planet carrier which radially surround the end regions of the bearing bolt.

For this, a clamping sleeve is placed with its one end face on the two components, and starting from its other end face is loaded by the actuator or by the actuating element with a joining force necessary for insertion, and inserted between the bearing bolt and the planet carrier.

The disadvantage here however is that with such arrangements, the clamping elements or clamping sleeves can tilt during insertion and be pressed asymmetrically between the components, wherein the rotationally fixed connection between the components is not achieved in the required manner.

The invention is based on the object of providing an arrangement with a press, with two components and with at least one clamping element, by means of which the clamping element can be inserted as evenly as possible between the two components.

According to the invention, this object is achieved with an arrangement with features of the present disclosure.

The arrangement according to the invention comprises a press, two components and at least one clamping element which can be inserted in the axial direction, via an actuating element of the press which is axially displaceable via an actuator, radially between a region of the first component and a region of the second component.

According to the invention, the actuating element passes through both the components and also the at least one clamping element in the axial direction. Furthermore, the actuating element at one end cooperates with the actuator and at the other end is configured with a cover element. Via the cover element, the actuating element is actively connected to the components. The at least one clamping element is arranged between the cover element and the components, or between the components and a housing region of the actuator. In addition, the actuating element and/or the actuator is movable by the actuator, for insertion of the clamping element between the components, in a scope reducing an axial distance between the cover element and the housing region of the actuator.

Because of the configuration of the arrangement according to the invention, tilting of the clamping element during insertion between the two components is avoided a simple manner. It is here particularly advantageous that the actuating element passes through the components and also the at least one clamping element in the axial direction. Furthermore, the configuration of the actuating element with the cover element promotes a symmetrical introduction of the clamping element between the components, since both the clamping element and the components of the press can be loaded evenly or symmetrically from both sides in the axial direction with the joining force necessary for insertion of the clamping element between the components.

In a variant of the arrangement according to the invention which is particularly favorable with regard to installation space, the actuating element may be actuated hydraulically via the actuator, since hydraulic actuators are characterized by a high power density.

If an actuation travel of the actuating element and/or the actuator is limited via housing-side stops in the region of the actuator, the process of joining the clamping element to the two components can be implemented to the desired scope without additional control and regulation complexity.

In a further advantageous variant of the arrangement according to the invention in which the clamping element can be introduced between the two components with little effort, and by means of which a desirable fixed mounting of the radially inner component in the radially outer component can be achieved, the clamping element is a clamping sleeve which is formed so as to be at least approximately cylindrical in the region of its outer periphery and so as to be at least approximately conical in the region of its inner diameter. The inner diameter of the clamping sleeve diminishes, starting from the side facing the components, in the direction of the side facing away from the components, whereby the holding force of the press fit rises with increasing insertion travel of the clamping sleeve between the two components.

If the radially inner component in the joint region has a conical outer contour which is at least approximately adapted to the clamping sleeve, while the radially outer component in the joint region is configured with an at least approximately cylindrical inner contour, a tilting of the clamping element during the joining process is avoided in a structurally simple fashion.

In an embodiment of the arrangement according to the invention which is favorable with regard to installation space, a distance between the stops for the actuating element and/or the actuator corresponds at least to the axial length of the region of the clamping element by which the clamping element can be inserted between the components.

In order to keep the joining forces to be applied during insertion of the clamping element between the two components as small as possible, in a further advantageous embodiment of the arrangement according to the invention, the radially inner component is configured with a line via which hydraulic fluid can be conducted under pressure into the joint region between the clamping element and the radially inner component. In this way, in a simple fashion, the clamping element can be reversibly expanded in the radial direction during the joining process, while the radially inner component in the joint region can be reversibly compressed in the circumferential direction by means of the pressurized hydraulic fluid supplied. If the compression force exerted via the hydraulic fluid in the joint region between the clamping element and the radially inner component is reduced further at the end of the joining process, then due to the associated contraction of the clamping element and the expansion of the radially inner opponent in the joint region between the two components and the clamping element, the desired bearing force is created which securely prevents relative movements between the two components.

If the clamping element is also configured with a line via which hydraulic fluid can be guided from the joint region between the clamping element and the radially inner component into the joint region between the clamping element and the radially outer component, also the radially outer component can be reversibly expanded via the hydraulic fluid, while the clamping sleeve in its radially outer region can be reversibly compressed in the circumferential direction or can be constricted during the joining process. If, at the end of the process of inserting the clamping element between the two components, which is carried out with the desired low joining forces, the pressurized hydraulic fluid supplied to the clamping element and the compression force exerted on the radially outer component are decreased again, the radially outer component shrinks onto the clamping element. This achieves the desired high bearing force between the radially outer component and the clamping element and hence also between the two components, which prevents relative movements between the two components to the desired extent.

In a refinement of the arrangement according to the invention which guarantees short installation times, during a mounting step, two clamping elements may be inserted between the radially inner component and the radially outer component by displacing the actuating element and/or the actuator, starting from sides of the components facing away from each other in the axial direction of the components.

In a refinement of the arrangement according to the invention, a spacer element may be arranged in the axial direction between the cover element or the housing region of the actuator and at least one of the components. Thus in a simple fashion, it is possible to insert only one clamping element between the components.

If the radially inner component is a bearing bolt of a planet wheel and the radially outer component is a planet carrier of a planetary gear mechanism, the active connection between the bearing bolt and the planet carrier can be created to the desired extent with little installation effort.

Both the features indicated in the claims and the features given in the following exemplary embodiment of the engine according to the invention are suitable, both alone or in any arbitrary combination, for refining the subject according to the invention.

Further advantages and advantageous embodiments of the arrangement according to the invention arise from the claims and the exemplary embodiment described in principle below with reference to the drawing.

Figure 2:
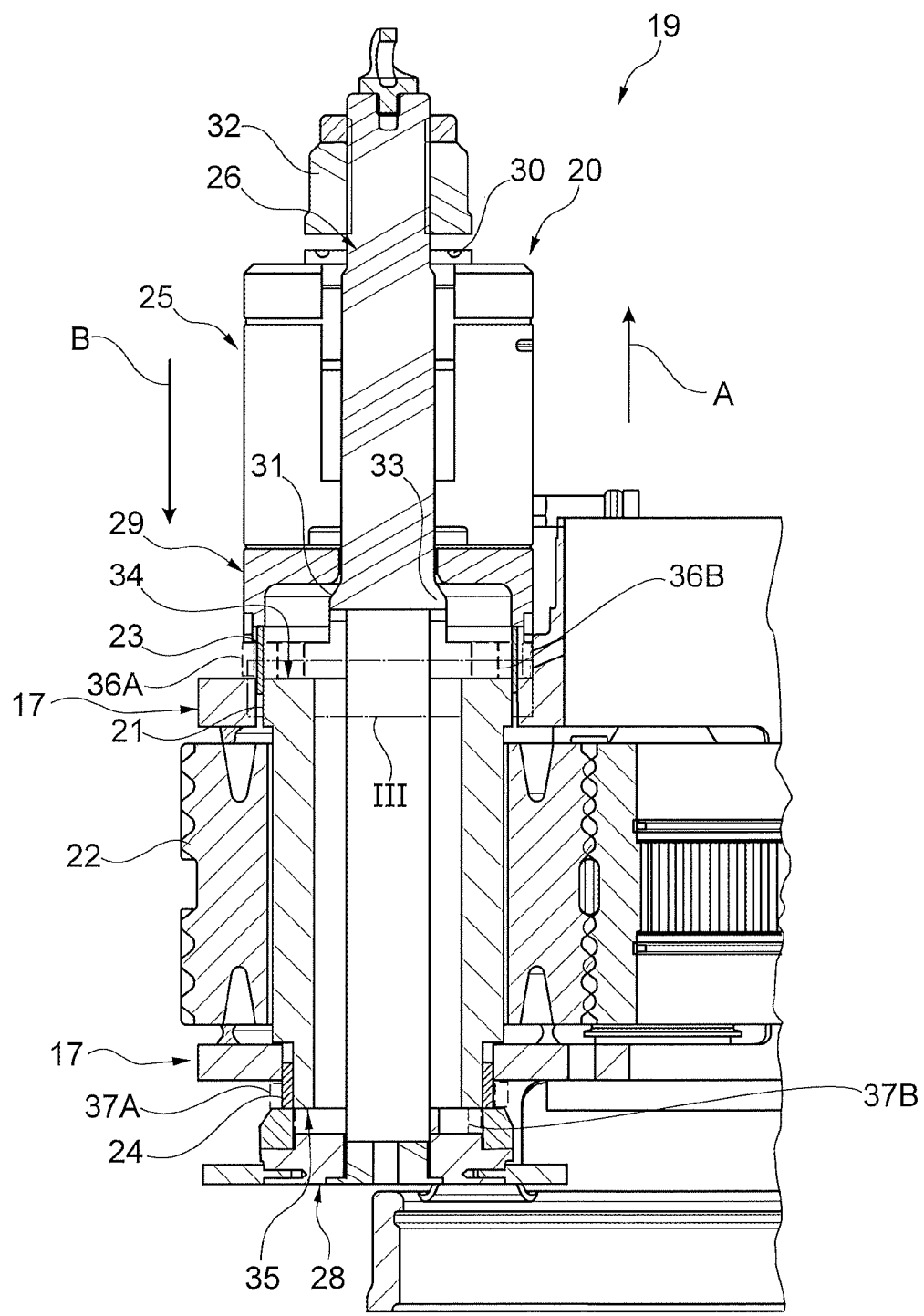
Figure 3:
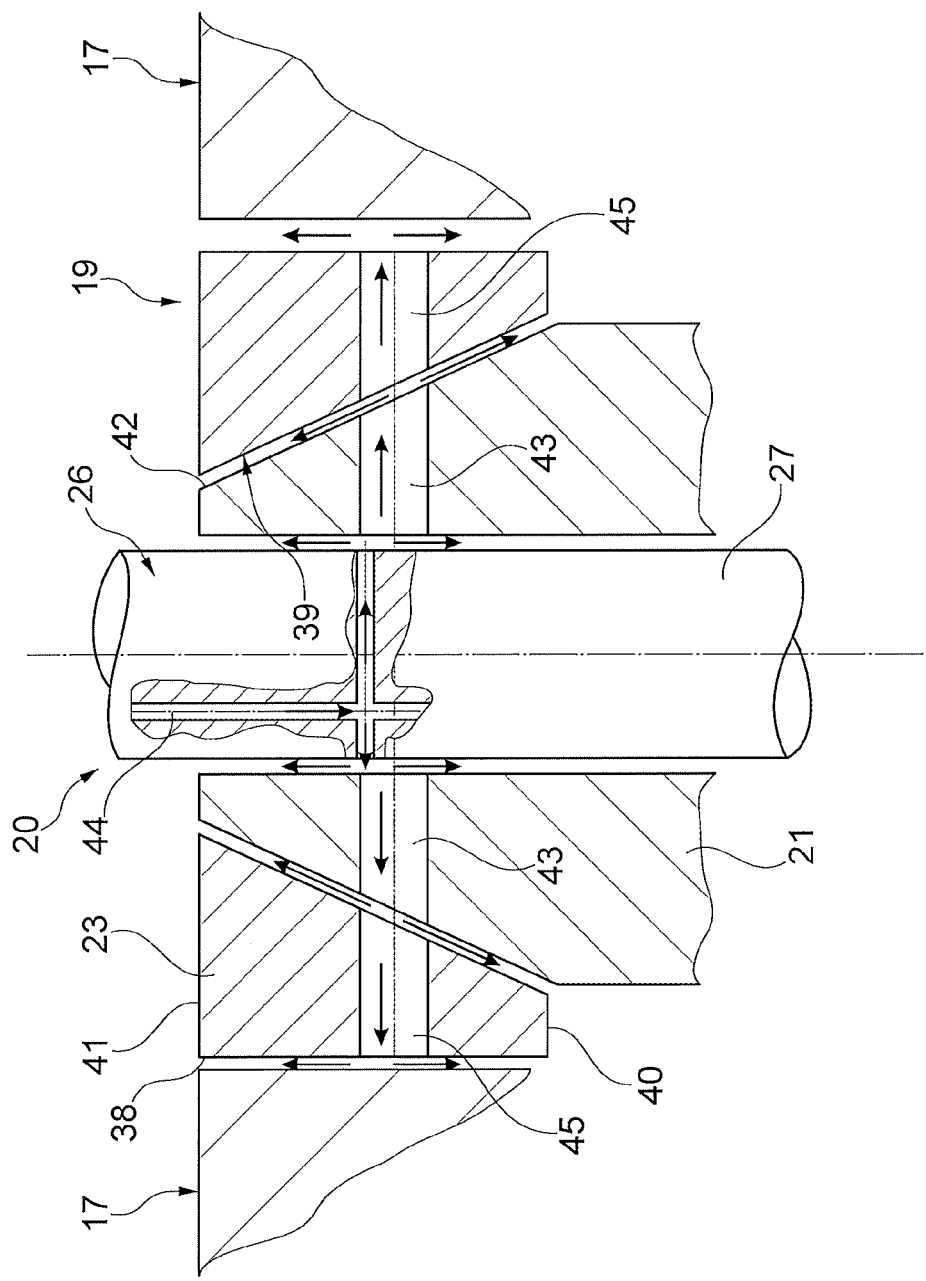

The drawings show:

FIG. 1 a simplified sectional depiction of an aircraft engine with a fan and with a low-pressure turbine, wherein the fan is connected to the low-pressure turbine via a gear mechanism;

FIG. 2 a highly diagrammatic, longitudinal, sectional view of a preferred embodiment of an arrangement with a press, with two components and with two clamping elements which can be inserted in the axial direction, via an actuating element of the press which is axially displaceable via an actuator, between regions of the first component and regions of the second component; and FIG. 3 an enlarged view of a region designated III in FIG. 2.

FIG. 1 shows a turbo-machine configured as an aircraft engine 1 of an aircraft, with a gear mechanism 5 which is configured as a planetary gear mechanism. The aircraft engine 1 is a turbo-machine with which the gear mechanism 5 may advantageously be combined. It is evident from the description below that the gear mechanism 5 may also be used with turbo-machines of other designs, such as a propeller turbine atmospheric engine or turboprop.

The aircraft engine 1 has a main rotation axis 2. The aircraft engine 1 furthermore comprises, in the axial flow direction X, an air intake 3, a fan 4, the gear mechanism 5, a low-pressure compressor 6, a high-pressure compressor 7, a combustion device 8, a high-pressure turbine 9, a low-pressure turbine 10, and an ejection nozzle 11. An engine gondola 12 surrounds the aircraft engine 1 and delimits the air intake 3.

The aircraft engine 1 works conventionally, wherein air entering the air intake 3 is accelerated by the fan 4 in order to generate two air flows. A first air flow flows into the intermediate pressure compressor 6 and a second air flow is guided through a secondary flow channel 13 or bypass channel in order to provide a drive thrust. The low-pressure compressor 6 compresses the air flow supplied to it before the air is compressed further in the region of the high-pressure compressor 7.

The compressed air flowing out of the high-pressure compressor 7 is conducted into the combustion device 8 where it is mixed with fuel, and the fuel-air mixture is combusted. The resulting hot combustion products expand, driving the high-pressure turbine 9 and the low-pressure turbine 10, before they are expelled via the ejection nozzle 11 in order to provide an additional drive thrust. The high-pressure turbine 9 and low-pressure turbine 10 respectively drive the high-pressure compressor 7 and low-pressure compressor 6 by means of a high-pressure shaft 14 and low-pressure shaft 15 respectively. The low-pressure shaft 15 coupling the low-pressure turbine 10 to the low-pressure compressor 6 is coupled to the fan 4 via the gear mechanism 5 constituting a reduction gear. A drive moment present at the gear mechanism 5 via the low-pressure shaft 15 is increased according to the translation ratio of the gear mechanism 5, and supplied to a fan shaft 16. If the fan 4 is driven by the low-pressure turbine 10, the rotation speed of the low-pressure shaft 15 is reduced according to the translation ratio of the gear mechanism 5, and the fan shaft 16 and fan 4 are driven with this reduced rotation speed and with a torque which is increased in comparison with the torque present at the low-pressure shaft 15.

In the embodiment of the gear mechanism 5 shown in FIG. 1, a sun wheel 18 of the gear mechanism 5 is connected in rotationally fixed fashion to the low-pressure shaft 15, and a planet carrier 17 of the gear mechanism 5 is connected in rotationally fixed fashion to the fan shaft 16. A ring gear 18A of the gear mechanism 5 is connected fixedly to the housing. Thus the gear mechanism 5 has an epicyclic design.

FIG. 2 shows a longitudinal sectional view of an arrangement 19 comprising a press 20, the planet carrier 17 and a bearing bolt 21 (to be connected thereto) for a planet wheel 22 of the gear mechanism 5 which is mounted rotationally thereon. In addition, the arrangement 19 is formed with two clamping elements 23, 24 which can each be inserted in the axial direction A or B, via an axially displaceable actuator 25 and an actuating element 26 of the press 20 which is axially displaceable via the actuator 25, radially between a region of the planet carrier 17 and a region of the bearing bolt 21. The actuating element 26 passes through the actuator 25, the planet carrier 17 and the bearing bolt 21 in the axial direction A or B.

In addition, the actuating element 26 cooperates at one end with the actuator 25 and at the other end is configured with a cover element 28. Via the cover element 28 and the clamping element 24, the actuating element 26 is actively connected to the planet carrier 17 and the bearing bolt 21. The clamping element 24 is positioned axially between the cover element 28 and the planet carrier 17 and the bearing bolt 21, while the clamping element 23 is arranged between the planet carrier 17 and the bearing bolt 21 and a housing region 29 of the actuator 25. In principle, the actuating element 26 and the actuator 25 are movable relative to the planet carrier 17 and the bearing bolt 21, for insertion of the clamping elements 23 and 24 between the planet carrier 17 and the bearing bolt 21, in a scope reducing an axial distance between the cover element 28 and the housing region 29 of the actuator 25.

In the present case, the actuator 25 is formed as a hydraulic actuator, by means of which the actuating element 26 can be moved in the axial direction A. Furthermore, the actuator 25 is configured such that during the axial displacement of the actuating element 26, the actuator 25 is also moved in the axial direction B towards the planet carrier 17 and the bearing bolt 21. The actuating travels of the actuating element 26 and actuator 25 are here limited by housing-side stops 30, 31 in the region of the actuator 25. The stop 30 cooperates with a nut 32 screwed onto the actuating element 26, while the actuating travels of the actuating element 26 and the actuator 25 are each limited, in the joining direction of the two clamping elements 23 and 24, by means of a wider diameter region 33 of the actuating element 26 cooperating with the stop 31.

During the joining process or during insertion of the clamping elements 23 and 24 between the planet carrier 17 and the bearing bolt 21 by the actuator-side axial displacement of the actuating element 26 and the associated movement of the actuator 25, the clamping elements 23 and 24 are inserted starting from sides 34, 35 facing away from each other in the axial direction of the planet carrier 17 and bearing bolt 21.

If via the arrangement 19, only the clamping element 23 or the clamping element 24 is to be inserted by the above-mentioned actuator-side displacement of the actuating element 26, or the movement of the actuator 25, between the planet carrier 17 and the bearing bolt 21 during a joining process, it is possible in a simple fashion to provide a sleeve-like or annular spacer element 36A or 36B or 37A or 37B (indicated merely in dotted lines in FIG. 2) either between the cover element 28 and the planet carrier 17 and/or the bearing bolt 21, or between the housing region 29 and the bearing bolt 17 and/or the planet carrier 17. The spacer element 36A or 36B or 37A or 37B prevents a reduction in the distance between the cover element 28 and the side 35, or between the housing region 29 and the side 34, and only the clamping element 23 or clamping element 24 is inserted between the planet carrier 17 and the bearing bolt 21 to the desired extent.

FIG. 3 shows an enlarged, sectional view of the region designated III in FIG. 2, which comprises the clamping element 23, a region of the actuating element 26, and regions of the bearing bolt 21 and planet carrier 17. It is evident from the depiction in FIG. 3 that the clamping element 23, which in principle has the same structure as the clamping element 24, is a clamping sleeve which is formed so as to be cylindrical in the region of its outer periphery 38 and so as to be conical in the region of its inner diameter 39. The inner diameter 39 of the clamping sleeve 23 decreases, starting from the side 40 facing the components or the planet carrier 17 and bearing bolt 21, in the direction of the side 41 facing away from the components or the planet carrier 17 and bearing bolt 21.

In addition, in the region of joining to the clamping element 23, the bearing bolt 21 has a conical outer contour 42 which is at least approximately adapted to the clamping sleeve 23, while in the region of joining to the clamping element 23, the planet carrier 17 is formed with a cylindrical inner contour. Both the planet carrier 17 and the bearing bolt 21 are configured, in the region of joining to the clamping element 24, as described in more detail above, in the same way as in the region of joining to the clamping element 23.

The bearing bolt 21 is configured with lines 43 which overlap with a line 44 of the actuating element 26 when the actuating element 26 reaches a defined position. Lines 45 are provided in the clamping element 23, via which hydraulic fluid can be guided from the joint region between the clamping element 23 and the bearing bolt 21 into the joint region between the clamping element 23 and the planet carrier 17. By introducing hydraulic fluid via the lines 44 and 43 into the joint regions between the clamping element 23 and the bearing bolt 21, or between the clamping element 23 and the planet carrier 17, during insertion of the clamping element 23 between the bearing bolt 21 and the planet carrier 17, the bearing bolt 21 can be reversibly constricted circumferentially and the clamping element 23 and planet carrier 17 can be reversibly expanded, while the clamping element 23 is reversibly compressed on the outer periphery 38. Thus the clamping element 23 can be inserted between the bearing bolt 21 and the planet carrier 17 with low joining forces.

At the end of the joining process, the hydraulic pressure applied is reduced or eliminated, whereby the earlier reversible expansion of the planet carrier 17 and the reversible constriction of the bearing bolt 21 are reversed, and the clamping element 23 creates the desired rotationally fixed connection between the planet carrier 17 and the bearing bolt 21 in the form of a press fit.

The line 44 of the actuating element 26 extends in the axial direction of the actuating element 26 into the joint region between the clamping element 24 and the bearing bolt 21 and planet carrier 17. The clamping element 24 and the bearing bolt 21, in the end region facing the side 35, are configured with lines to the same extent in order to be able to conduct hydraulic fluid, during the joining process of the clamping element 24, via the actuating element 26 into the joint regions between the clamping element 24 and the bearing bolt 21 and between the clamping element 24 and the planet carrier 17.

LIST OF REFERENCE SIGNS

1 Turbo-machine; aircraft engine
2 Main rotation axis
3 Air intake
4 Fan
5 Gear mechanism
6 Low-pressure compressor
7 High-pressure compressor
8 Combustion device
9 High-pressure turbine
10 Low-pressure turbine
11 Ejection nozzle
12 Engine gondola
13 Secondary flow channel
14 High-pressure shaft
15 Low-pressure shaft
16 Fan shaft 17 Planet carrier
18 Sun wheel
18A Ring gear
19 Arrangement
20 Press
21 Bearing bolt
22 Planet wheel
23 Clamping element
24 Clamping element
25 Actuator
26 Actuating element
28 Cover element
29 Housing region of actuator
30, 31 Housing-side stop
32 Nut
33 Enlarged diameter region of actuating element
34, 35 Side of planet carrier and bearing bolt
36A to 37B Spacer element
38 Outer periphery of clamping element 23
39 Inner diameter of clamping element 23
40, 41 Side of clamping element 23
42 Conical outer contour of bearing bolt
43 Line of bearing bolt
44 Line of actuating element
45 Line of clamping element 23
A, B Axial direction
X Axial flow direction

The invention claimed is:

1. An arrangement with a press, comprising:
   an actuator including a housing region;
   an actuating element having a first end and an opposite second end and being displaceable in an axial direction by the actuator;
   a first component and a second component;
   a clamping element positioned radially between a region of the first component and a region of the second component and which is movable in the axial direction by the actuating element;
   a cover element;
   the actuating element passing through the first component, the second component and the clamping element in the axial direction, the first end of the actuating element operatively connected with the actuator and the second end connected to the cover element to connect the actuating element to the first and second components;
   the clamping element being axially arranged between 1) the cover element and the first and second components, and/or 2) the housing region of the actuator and the first aid second components;
   wherein displacement in the axial direction of the actuating element and/or the actuator moves the clamping element between the first and second components to reduce an axial distance between the cover element and the housing region of the actuator.

2. The arrangement according to claim 1, wherein the actuator is a hydraulic actuator and the actuating element is actuated hydraulically via the actuator.

3. The arrangement according to claim 1, and further comprising housing-side stops positioned in a region of the actuator that limit an actuation travel of the actuating element and/or the actuator.

4. The arrangement according to claim 1, wherein the clamping element is a clamping sleeve which is cylindrical in an outer peripheral region and conical at an inner periphery, wherein an inner diameter of the inner periphery diminishes in a direction away from an axial interior of the first and second components toward an axial exterior of the first and second components.

5. The arrangement according to claim 4, wherein a radially inner one of the first and second components includes, in an area of the clamping sleeve, a conical outer contour corresponding to the conical inner periphery of the clamping sleeve, while a radially outer one of the first and second components includes a cylindrical outer contour in an area of the clamping sleeve.

6. The arrangement according to claim 3, wherein a distance between the housing-side stops corresponds at least to an axial length of a region of the clamping element by which the clamping element is insertable between the first and second components by the the actuating element and/or the actuator.

7. The arrangement according to claim 1, and further comprising a first joint region between the clamping element and a radially inner one of the first and second components, wherein the radially inner one of the first and second components includes a conduit via which hydraulic fluid is conducted under pressure into the first joint region.

8. The arrangement according to claim 1, and further comprising a first joint region between the clamping element and a radially inner one of the first and second components and a second joint region between the clamping element and a radially outer one of the first and second components, wherein the clamping element includes a conduit via which hydraulic fluid is guided between the first joint region and the second joint.

9. The arrangement according to claim 1, and further comprising a further clamping element, with the clamping element and the further clamping element being displaceable in the axial direction between the first and second components by displacement of the actuating element and/or the actuator, starting from sides of the first and second components facing away from each other, to displace the clamping element and the further clamping element in a direction toward an axial interior of the first and second components.

10. The arrangement according to claim 1, and further comprising a spacer element arranged in the axial direction between the cover element or the housing region of the actuator and at least one of the first and second components.

11. The arrangement according to claim 1, wherein a radially inner one of the first and second components is a bearing bolt of a planet wheel and a radially outer one of the first and second components is a planet carrier of a planetary gear mechanism.

* * * * *